(12) United States Patent
Sherlock

(10) Patent No.: US 11,142,892 B2
(45) Date of Patent: Oct. 12, 2021

(54) WORK MACHINE WITH AUTOMATIC DETECTION OF POSITIONING CORRECTION DATA TRANSMITTERS

(71) Applicant: Deere & Company, Moline, IL (US)

(72) Inventor: Lance R. Sherlock, Asbury, IA (US)

(73) Assignee: Deere & Company, Moline, IL (US)

( * ) Notice: Subject to any disclaimer, the term of this patent is extended or adjusted under 35 U.S.C. 154(b) by 253 days.

(21) Appl. No.: 16/506,126

(22) Filed: Jul. 9, 2019

(65) Prior Publication Data
US 2021/0010246 A1    Jan. 14, 2021

(51) Int. Cl.
| | |
|---|---|
| *E02F 9/26* | (2006.01) |
| *G06F 16/9035* | (2019.01) |
| *G07C 5/00* | (2006.01) |
| *G01S 19/41* | (2010.01) |

(52) U.S. Cl.
CPC ............ *E02F 9/265* (2013.01); *G01S 19/41* (2013.01); *G06F 16/9035* (2019.01); *G07C 5/008* (2013.01)

(58) Field of Classification Search
CPC .......... E02F 9/265; E02F 9/205; E02F 9/268; G06F 16/9035; G07C 5/008; G01S 19/41; G01S 19/10; G01S 19/44; G01S 19/33; G01S 19/48; G01S 19/396; G01S 19/40; G01C 21/005
See application file for complete search history.

(56) References Cited

U.S. PATENT DOCUMENTS

| | | | |
|---|---|---|---|
| 5,899,957 A | 5/1999 | Loomis | |
| 7,079,075 B1 * | 7/2006 | Connor | G01C 15/00 342/357.41 |
| 8,712,686 B2 * | 4/2014 | Bandyopadhyay | G01C 21/165 701/446 |
| 9,829,582 B2 * | 11/2017 | Wu | G01S 19/073 |
| 10,386,495 B1 * | 8/2019 | Zhu | G01S 19/23 |
| 10,578,743 B1 * | 3/2020 | Kalathil | H04W 64/003 |
| 10,775,513 B1 * | 9/2020 | Averin | G01S 19/55 |
| 10,809,388 B1 * | 10/2020 | Carcanague | G01S 19/44 |
| 2016/0116601 A1 * | 4/2016 | Horn | G01S 19/44 342/357.27 |
| 2016/0202357 A1 | 7/2016 | Matthews | |

(Continued)

OTHER PUBLICATIONS

German Search Report issued in counterpart application No. 102020208304.5 dated Feb. 24, 2021 (12 pages).

*Primary Examiner* — Richard M Camby

(74) *Attorney, Agent, or Firm* — Joseph R. Kelly; Kelly, Holt & Christensen PLLC

(57) ABSTRACT

A method performed by a computing system for a work machine at a worksite includes automatically identifying a set of local devices corresponding to the worksite based on signals detected from the set of local devices. Each of the local devices is configured to transmit correction data for correcting position data derived from a satellite navigation signal. One or more of the local devices is selected from the set of local devices, and the satellite navigation system is received, and used to generate the position data indicative of a geographic position of the work machine at the worksite. The method includes receiving the correction data from the one or more local devices, generating corrected position data by applying the correction data to the position data, and controlling the work machine based on the corrected position data.

20 Claims, 14 Drawing Sheets

(56) References Cited

U.S. PATENT DOCUMENTS

2019/0154837 A1\* 5/2019 Noble ................... G01S 19/04
2019/0187298 A1\* 6/2019 Grgich .................. G01S 19/39
2019/0302274 A1\* 10/2019 Berntorp ............... G01S 19/393
2021/0080591 A1\* 3/2021 Gunnarsson ........... G01S 19/25

\* cited by examiner

WORK MACHINE WITH AUTOMATIC DETECTION OF POSITIONING CORRECTION DATA TRANSMITTERS

FIELD OF THE DESCRIPTION

The present description generally relates to mobile work machines that utilize geographic positioning information. More specifically, but not by limitation, the present description relates to a computing system for a mobile work machine that automatically detects local transmitters that transmit correction data for correcting position data derived from a satellite navigation signal.

BACKGROUND

There are a wide variety of different types of work machines. Those work machines can include construction machines, turf management machines, forestry machines, agricultural machines, etc. having controllable subsystem(s) that perform a variety of tasks on a worksite. Many of these pieces of mobile equipment have mechanisms that are controlled by the operator in performing operations. For instance, a construction machine can have multiple different mechanical, electrical, hydraulic, pneumatic and electro-mechanical subsystems, among others, all of which can be operated by the operator to grade a worksite. Many such work machines utilize high precision geographic location information to perform the work operation on a worksite.

The discussion above is merely provided for general background information and is not intended to be used as an aid in determining the scope of the claimed subject matter.

SUMMARY

A method performed by a computing system for a work machine at a worksite includes automatically identifying a set of local devices corresponding to the worksite based on signals detected from the set of local devices. Each of the local devices is configured to transmit correction data for correcting position data derived from a satellite navigation signal. One or more of the local devices is selected from the set of local devices, and the satellite navigation system is received, and used to generate the position data indicative of a geographic position of the work machine at the worksite. The method includes receiving the correction data from the one or more local devices, generating corrected position data by applying the correction data to the position data, and controlling the work machine based on the corrected position data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description generally relates to mobile work machines that utilize geographic positioning information. More specifically, but not by limitation, the present description relates to a computing system for a mobile work machine that automatically detects local transmitters that transmit correction data for correcting position data derived from a satellite navigation signal.

A work machine can be any type of work machine that moves and performs tasks on a work site. Some work machines perform aerial work operations, while other machines may perform nautical or under water work operations, and some machines perform ground-based work operations. Examples of work operations include agricultural, construction, and/or turf and forestry work operations. Particular examples of work machines include, but are not limited to, an agricultural machine (e.g., a harvester or combine, a tractor carrying or towing an implement, etc.), an earth-moving machine (e.g., scraper, excavator, loader, dump truck, etc.), to name a few.

Figure 1:
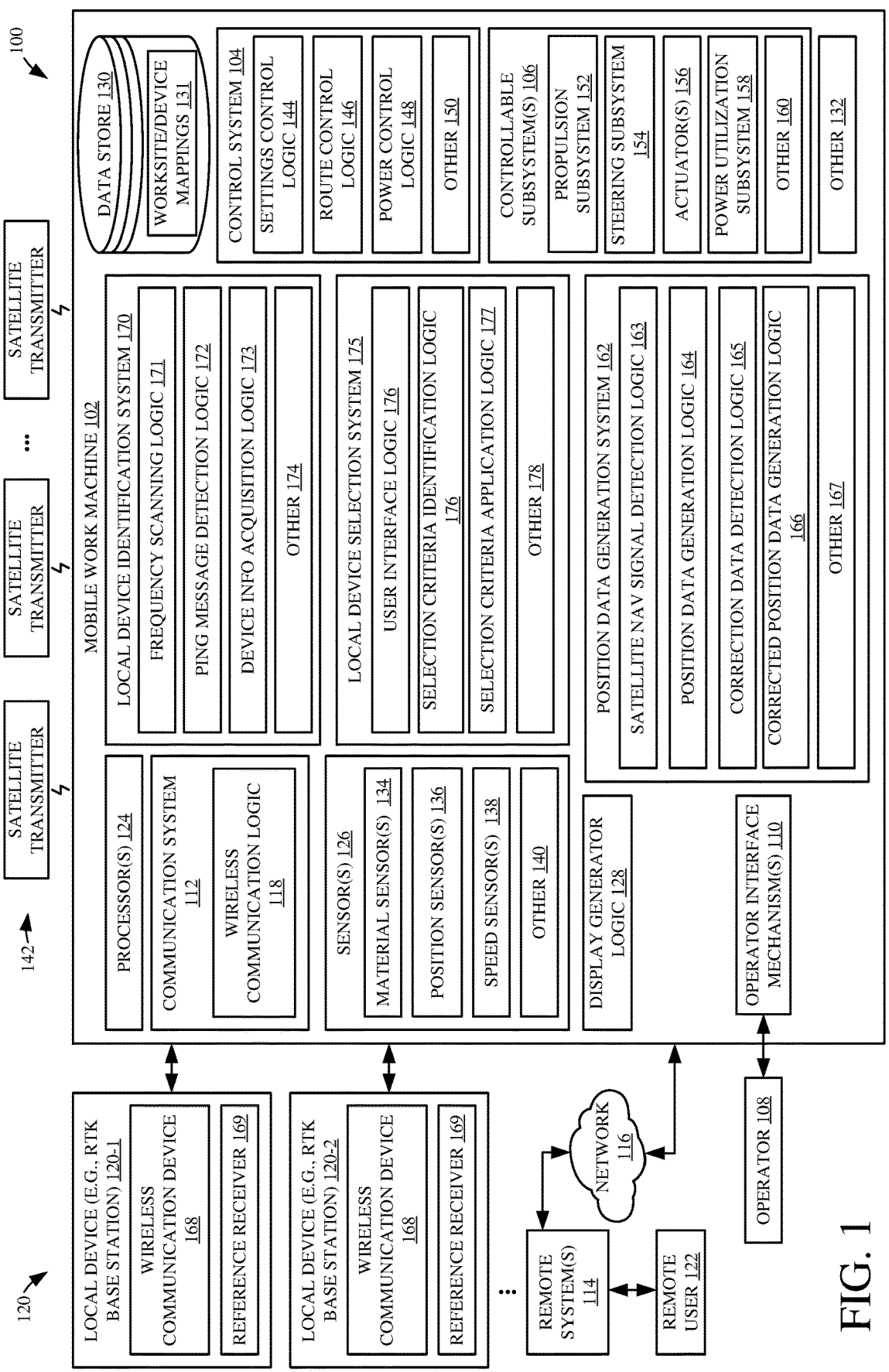
FIG. 1 is a block diagram showing one example of a work machine architecture that includes a mobile work machine.

FIG. 1 is a block diagram showing one example of a work machine architecture 100 that includes a mobile work machine 102. Work machine 102 includes a control system 104 configured to control a set of controllable subsystems 106 that perform operations on a worksite. For instance, an operator 108 can interact with and control work machine 102 through operator interface mechanism(s) 110. Operator interface mechanism(s) 110 can include such things as a steering wheel, pedals, levers, joysticks, buttons, dials, linkages, etc. In addition, they can include a display device that displays user actuatable elements, such as icons, links, buttons, etc. Where the device is a touch sensitive display, those user actuatable items can be actuated by touch gestures. Similarly, where mechanism(s) 110 includes speech processing mechanisms, then operator 108 can provide inputs and receive outputs through a microphone and speaker, respectively. Operator interface mechanism(s) 110 can include any of a wide variety of other audio, visual or haptic mechanisms.

Work machine 102 includes a communication system 112 configured to communicate with other systems, devices or machines in architecture 100. For example, communication system 112 can communicate with other local machines, such as other machines operating on a same worksite as work machine 102. In the illustrated example, communication system 112 is configured to communicate with one or more remote systems 114 over a network 116. Network 116 can be any of a wide variety of different types of networks. For instance, it can be a wide area network, a local area network, a near field communication network, a cellular communication network, or any of a wide variety of other networks, or combinations of networks.

Communication system 112 includes wireless communication logic 118 configured to communicate over network 116 and/or directly with a plurality of local devices 120. Wireless communication logic 118 can communicate through any of a wide variety of different types of wireless communication protocols. Some examples include, but are not limited, Bluetooth, WiFi, and the like.

A remote user 122 is illustrated as interacting with remote system 114, such as to receive communications from or send communications to work machine 102 through communication system 112. For example, but not by limitation, remote user 122 can receive communications, such as notifications, requests for assistance, etc., from work machine 102 on a mobile device.

FIG. 1 also shows that work machine 102 includes one or more processors 124, sensors 126, display generator logic 128, a data store 130, and can include other items 132 as well. Sensors 126 can include any of a wide variety of sensors depending on the type of work machine 102. For instance, sensors 126 can include material sensors 134, position sensors 136, speed sensors 138, and can include other sensors 140 as well. Material sensors 134 are configured to sense material being moved, processed, or otherwise worked on by work machine 102.

Position sensors 136 are configured to identify a position of work machine 102 as it traverses the worksite. Position sensors 136 can illustratively include a satellite navigation system receiver configured to receive signals from a set of satellite transmitters 142. For example, but not by limitation, this can include a Global Navigation Satellite System (GNSS) receiver that receives signals from one or more GNSS satellite transmitters. Sensor(s) 136 can also include a Real-Time Kinematic (RTK) component that is configured to enhance the precision of position data derived from the GNSS signal from the receiver. This is discussed in further detail below. Briefly, however, an RTK component uses measurements of the phase of the signal's carrier wave in addition to the information content of the signal to provide real-time corrections, which can provide up to centimeter-level accuracy of the position determination. Position sensor(s) 136 can include other items as well.

Speed sensors 138 are configured to output a signal indicative of a speed of work machine 102 across the worksite.

Control system 104 can include settings control logic 144, route control logic 146, power control logic 148, and it can include other items 150. Controllable subsystems 106 can include propulsion subsystem 152, steering subsystem 154, one or more different actuators 156 that can be used to change machine settings, machine configuration, etc., power utilization subsystem 158, and can include a wide variety of other systems, some of which are described below.

Settings control logic 144 can control one or more of subsystems 106 in order to change machine settings based upon the predicted and/or observed conditions or characteristics of the worksite. Route control logic 146 can control steering subsystem 154. Power control logic 148 generates control signals to control power utilization subsystem 158. For instance, it can allocate power to different subsystems, generally increase power utilization or decrease power utilization, etc. These are just examples and a wide variety of other control systems can be used to control other controllable subsystems in different ways as well.

Figure 2:
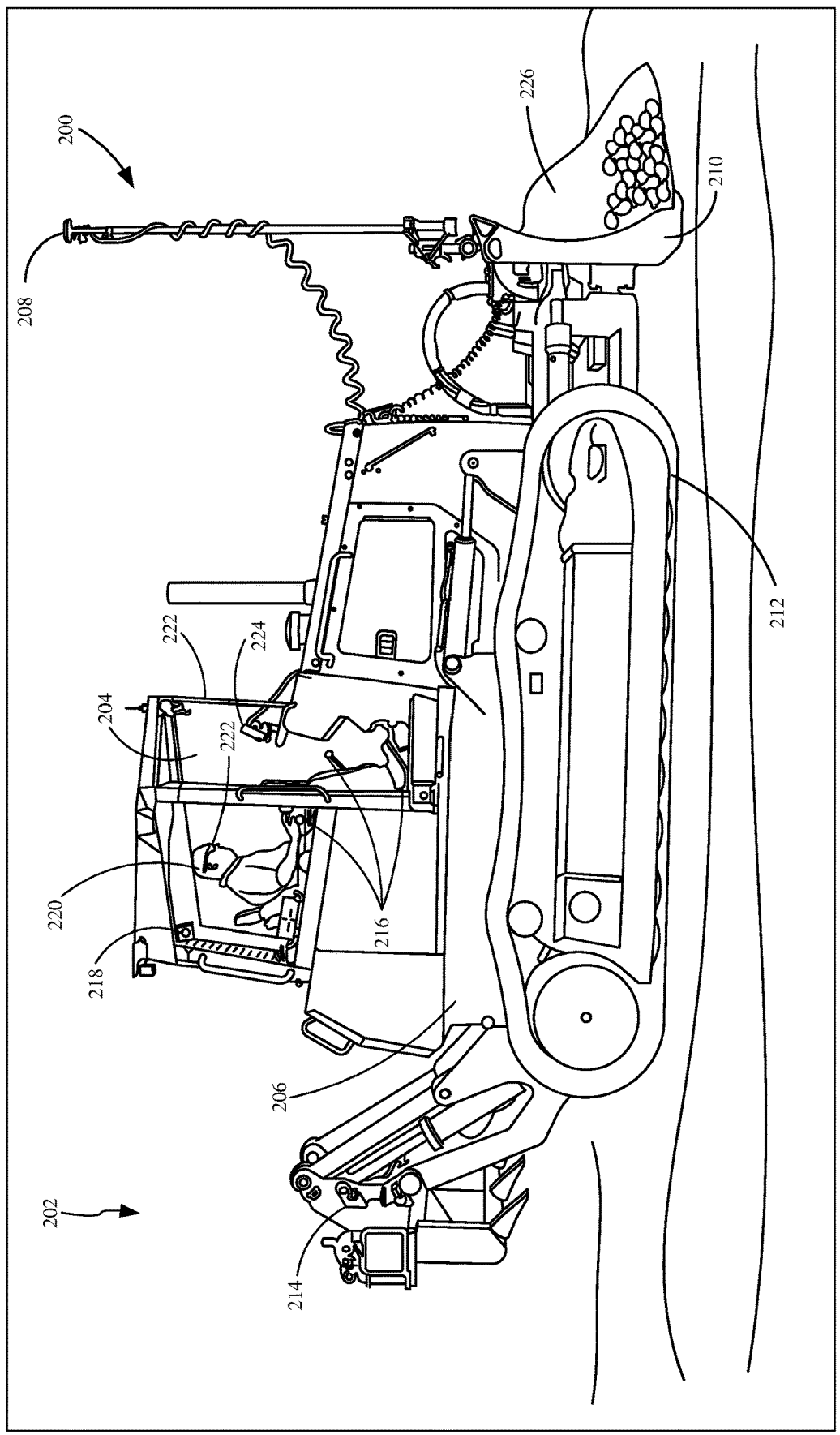
FIG. 2 is a schematic illustration of one example of a work machine in a worksite.

As noted above, work machine 102 can take a wide variety of different forms. FIG. 2 illustrates one example of an earth-moving work machine. More specifically, FIG. 2 is a schematic illustration of a work machine 200 in a worksite 202. Work machine 200 illustratively includes operator cab 204, frame 206, sensors 208, blade 210, ground-engaging elements 212, and a ripper 214.

Work machine 200 is often operated by an operator in operator cab 204. However, in some instances, work machine 200 may operate at different levels of autonomy, where an operator cab 204 is not necessary. Operator cab 204 includes mechanical user interface mechanisms 216 (e.g., levers, pedals, steering wheels, etc.). Operator cab 204 also includes operator sensor 218 that senses a position or other characteristics of operator 220 in the operator cab 204. For example, operator sensor 218 can determine a position of operator 220 relative to an augmented display. As another example, operator sensor 218 can detect which direction that operator 220 is looking. Operator cab 204 can also include augmented display devices 222, which can be, for example, head-mounted or window mounted. Operator cab 204 can also include standard display devices 224, such as an LCD or LED screen. Operator cab 204 and its components are supported by a frame 206.

Blade 210 is controlled by operator 220 to move or push material 226. Ground engaging elements 212 drive and direct movement of work machine 200 about worksite 202. Ground engaging elements 212, as shown are tracks, however in other examples they may include other mechanisms as well, such as wheels. Ripper 214 can be controlled by operator 220 to till or rip a surface of worksite 202. Ripper 214 is also sometimes used to extract large rocks, stumps or other objects from a surface of worksite 202.

To aid in operation of work machine 200, sensors 208 can sense various aspects of operation. For example, sensors 208 can include visual sensors, hydraulic strain gauges, pressure gauges, linear displacement transducers, hall effect sensors, potentiometers, odometers, fuel gauges, global positioning system (GPS) receivers, compasses, gyroscopes, accelerometers, etc. For example, as shown, there is a position sensor used to sense the location of work machine 200. There is also a linear displacement transducer (LDT) mounted on a hydraulic cylinder coupled to blade 210 which can be used to sense the angular position of blade 210, relative to frame 206.

Figure 3:
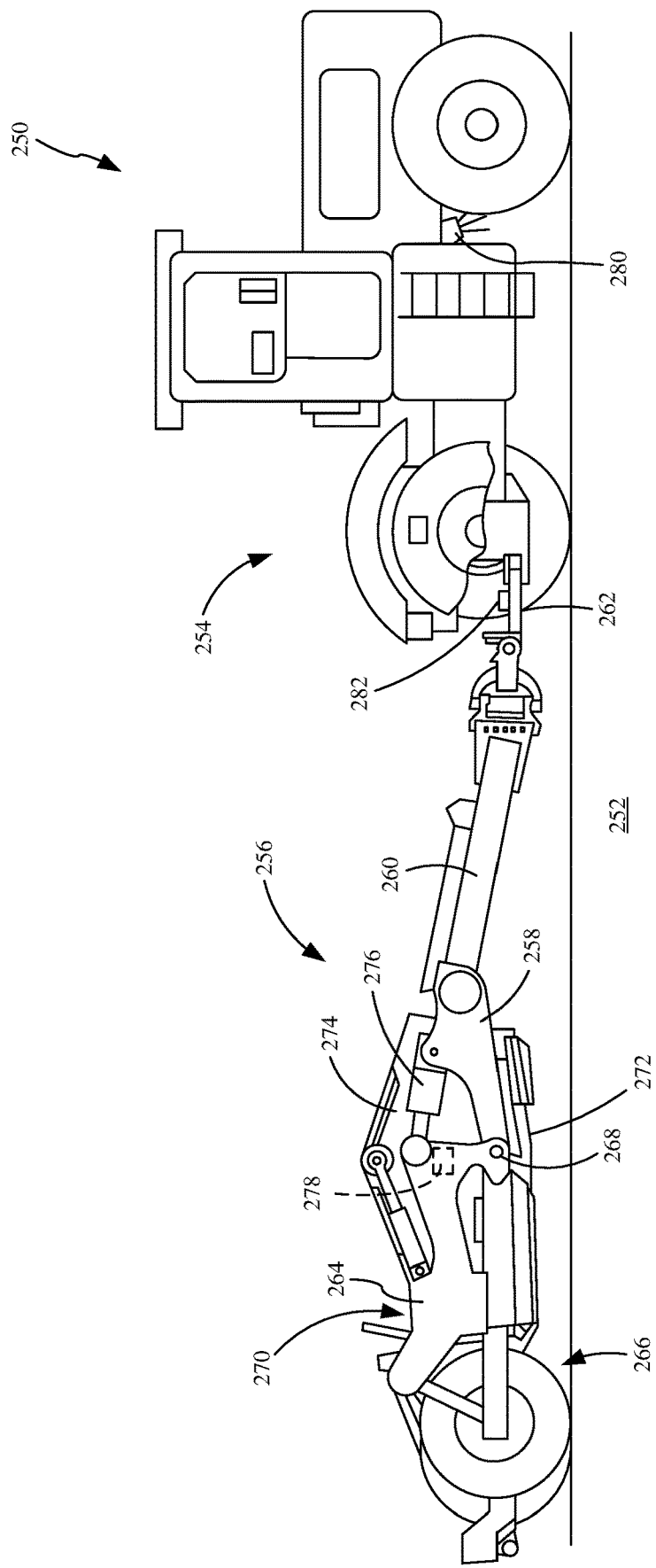
FIG. 3 is a schematic illustration of one example of a work machine in a worksite.

FIG. 3 illustrates another example of a work machine 250 operating on a worksite 252. In the illustrated example, work machine 250 comprises a towing vehicle 254, such as a conventional tractor, pulling a pull-type to towed scraper 256. Scraper 256 includes a relatively fixed front frame 258 attached to a forward extending tongue 260 which is coupled to a drawbar 262 of work machine 250. The scraper 256 also includes a rear frame 264 which has an aft end supported by ground engaging wheels 266 and which is pivotally coupled to the front frame 258 by pivot 268.

Scraper 256 includes a container 270 and a cutting edge that can be raised or lowered to control the depth of the cut, and thus the rate at which the material is accumulated in container 270. As the scraper 256 moves along a surface, the cutting edge can scrape up earth and fill the container 270. In one example, the cutting edge comprises a blade 272 which projects from the bottom of a gate 274 which is fixed relative to rear frame structure 264.

Blade 272 is raised and lowered by one or more actuators (such as blade lift cylinders 276). A blade position sensor 278 on scraper 256 senses the position or angle of blade 272 with respect to front frame 258. Gate 274 is movable by one or more actuators between an open position, in which container 270 receives scraped material from blade 272 and a closed position that prevents material from entering container 270.

A vehicle speed sensor 280 is mounted on work machine 250. In one example, a draft force sensor 282 is mounted on a surface of drawbar 262 to detect the draft force of work machine 250 on scraper 256.

Referring again to FIG. 1, and as noted above, work machine 102 utilizes high-precision geographic location data in performing worksite operations. A position data generation system is configured to generate position data, indicative of a geographic location of work machine 102 (such as global positioning coordinates) based on signals from satellite transmitters 142. Satellite transmitters 142 are part of a satellite navigation system and generates corresponding satellite navigation signals that are detected by satellite navigation signal detection logic 163. The satellite navigation system can be any of a wide variety of different types. In one example, satellite transmitters 142 are part of a global navigation satellite system (GNSS). Examples of such systems include, but are not limited to, GPS, GLONASS, BEIDOU, GALILEO, QZSS, IRNSS and SBAS, which use satellites in space to locate the position (e.g., three dimensional coordinates) of GNSS receivers, or their antennas, on or above Earth. Typically, both pseudo-range and integrated carrier phase GNSS measurements are available within a civilian GNSS receiver for each carrier signal of each GNSS satellite that is being tracked. The pseudo-range measurement records the apparent time duration taken for the relevant code to travel from the satellite to the receiver. The time duration equals the time the signal arrives at the receiver according to the receiver clock minus the time the signal left the satellite according to the satellite clock.

In a GNSS receiver, an example carrier phase measurement can be obtained by integrating a reconstructed carrier of the signal as it arrives at the receiver, or in accordance with other measurement techniques. The carrier phase measurement is a measure of a transit time difference as determined by the time the signal left the satellite according to the satellite clock and the time it arrives at the receiver according to the receiver clock. However, because the initial number of whole cycles in transit between the satellite and the receiver, when the receiver starts tracking the carrier phase of the signal, is not known, the transit time difference obtained from the carrier phase will typically be in error by a multiple (e.g., plus or minus one integer or its equivalent wavelength) carrier cycles. Accordingly, there is a whole-cycle ambiguity in the carrier phase measurement for the carrier phase between the receiver and each satellite, until it is resolved through various procedures.

The range or distance between a GNSS receiver and each of a multitude of observable satellites is calculated by multiplying each signal's travel time from the satellite to the GNSS receiver by the speed of light. These ranges are usually referred to as pseudo-ranges because the receiver clock generally has a significant time error which causes a common bias in the measured range with respect to each satellite in a set of satellite signals received by the receiver. By using differenced measurements, the common bias from receiver clock error is solved for along with the position coordinates of the receiver as part of the normal navigation computation. Various other factors can also lead to errors or noise in the calculated range, including ephemeris error, satellite clock timing error, atmospheric effects, receiver noise and multipath error. In standalone GNSS navigation, where the receiver obtains code and/or carrier-phase ranges from multiple satellites without the benefit of corrections from any reference stations, the receiver is very limited in methods available to reduce the errors or noises in the ranges.

To eliminate or reduce systematic errors, differential operations are typically used in GNSS applications. Differential GNSS operations typically involve one or more reference receivers located at known sites (sometimes called base stations) together with a communication link between the user's mobile receiver and the reference receiver. The reference receivers generate correction data associated with some or all of the above errors and the correction data is sent to the user receiver over the communication link. The mobile receiver then applies the correction data to its own carrier phase measurements or position estimate and thereby obtains a more accurate computed position. The correction data from a respective reference receiver can be in the form of corrections to the reference receiver position determined at the reference site or in the form of corrections to the specific GNSS satellite clock and/or orbit data. Differential operations using carrier-phase measurements are often referred to as real-time kinematic (RTK) positioning/navigation operations.

In the illustrated example of FIG. 1, system 162 includes position data generation logic 164 that generates position data based on the detected signals from satellite transmitters 142. Correction data detection logic 165 obtains correction data that is used by corrected position data generator logic 166 to generated corrected position data, representing the geographic location of work machine 102. System 162 can include other items 167 as well.

In one example, logic 165 comprises a correction receiver configured to receive correction information from a set of (one or more) local devices 120, such as differential correction base stations. The set of local devices 120 illustratively includes a first local device 120-1 and a second local device 120-2 (collectively referred to as local devices 120). While two local devices 120 are illustrated in FIG. 1, any number of local devices 120 can be utilized.

In the illustrated example, local devices 120 comprise RTK base stations each having a wireless communication device 168 and a reference receiver 169. The wireless communication device 168 is configured to communicate with wireless communication logic 118, to transmit the correction data that is detected by logic 165. Using this correction data, the position data generated by system 162 can have a spatial resolution on the order of several centimeters, once corrected, although less precise systems can just as easily be used. These are examples only, and other examples of geographic location systems can be utilized.

In the present example, logic 165 detects RTK signals from devices 120 that encode RTK correction data. In one example, reference receiver 169 includes a GNNS navigation receiver that receives signals from satellite transmitters 142, and determines the RTK correction data, such as an offset vector (e.g., base offset vector) or difference between an observed position of the local device based on a measured carrier phase of the satellite signals and known position or coordinates of the reference receiver 169. The local device 120, using wireless communication device 168, forwards or transmits the RTK correction data to work machine 102, via the wireless communication devices, in real-time to support precise position determination and navigation at work machine 102.

In some systems, users connect the computing system of work machine 102 to a desired set of RTK base stations (or other local devices configured to generate correction data) through a manual process that requires advanced knowledge of the settings and configurations of the base stations. For sake of illustration, but not by limitation, assume operator 108 enters a new worksite to perform worksite operations using work machine 102. The worksite has a plurality of RTK base stations (or other local devices configured to transmit correction data). The user connects to one or more of those base stations by manually entering the associated configuration data of the base stations, such as the frequency and channel spacing used by the base station to communicate through the wireless communication channel. This can be entered using operator interface mechanisms 110, which can be provided by on-board input/output devices in the operator compartment and/or a mobile device used by operator 108, or otherwise.

Figure 4:
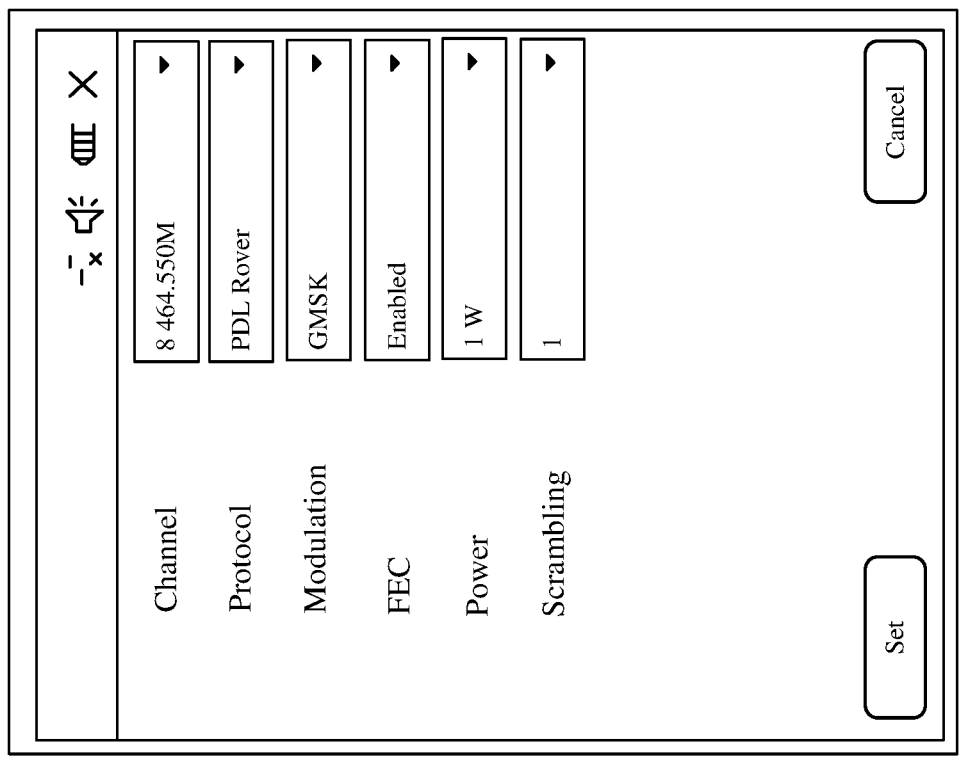
FIG. 4 illustrates an example user interface display for a user to enter configuration data for a base station.
Figure 5:
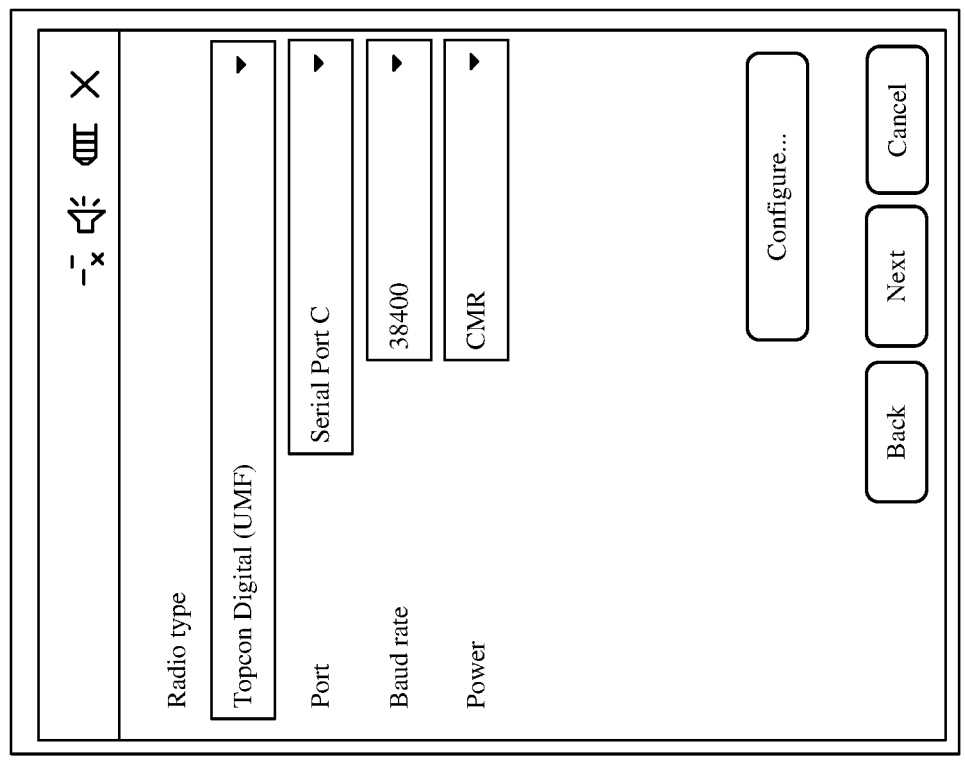
FIG. 5 illustrates an example user interface display for a user to enter configuration data for a base station.

FIGS. 4 and 5 illustrate example user interface displays for a user to enter the configuration data for a particular base station that the user wants to connect to at the worksite. However, this requires advanced knowledge of the settings, as well as accurate user input. If the channel and/or frequency are mis-keyed or otherwise entered improperly, this will result in failure of the work machine to connect to the base station. Additionally, the operator may not know why the machine failed to connect to the base station in such a scenario. In addition, this is time consuming for the operator as they must obtain this information in some way beforehand, such as through separate communication with a manager, by physically going to the base stations to obtain this data and then manually keying it into the machine, or otherwise.

In the illustrated example, work machine 102 includes a local device identification system 170 configured to automatically identify the set of local devices 120 corresponding to the worksite, based on detecting signals from those devices 120. System 170 includes frequency scanning logic 171 configured to scan a known range of frequencies that local devices 120 may broadcast on. System 170 can also include ping message detection logic 172 configured to detect ping messages sent by local devices 120 on those frequencies, indicating that those devices are running and ready for connection to work machine 102. Device information acquisition logic 173 is configured to acquire corresponding device information for the local devices identified by system 170. This information can include, but is not limited to, a unique identification number, a channel that the device is broadcasting on, a frequency that the device is using, a radio type or protocol being used, transmission format information, or any other device into. System 170 can include other items 174 as well.

Work machine 102 also includes a local device selection system 175 configured to select one or more of the set of local devices 120, to which work machine 102 will connect and receive correction data. System 175 includes user interface logic 176 configured to generate user interface displays, for example through control of display generator logic 128. System 175 also includes selection criteria identification logic 176, selection criteria application logic 177, and can include other items 178 as well.

Selection criteria identification logic 176 is configured to identify selection criteria that are used to select the local device(s) 120, and logic 177 is configured to apply that selection criteria. Selection criteria can take any of a wide variety of forms. Examples are described in further detail below. Briefly, however, this can include a filter criterion that is used to filter the set of available local devices 120 into a subset of devices that are selected (automatically or manually) using logic 177. In one example, the selection criteria can comprise a predefined selection of the local devices. This can include devices previously selected by operator 108, remote user 122, or otherwise.

Figure 6:
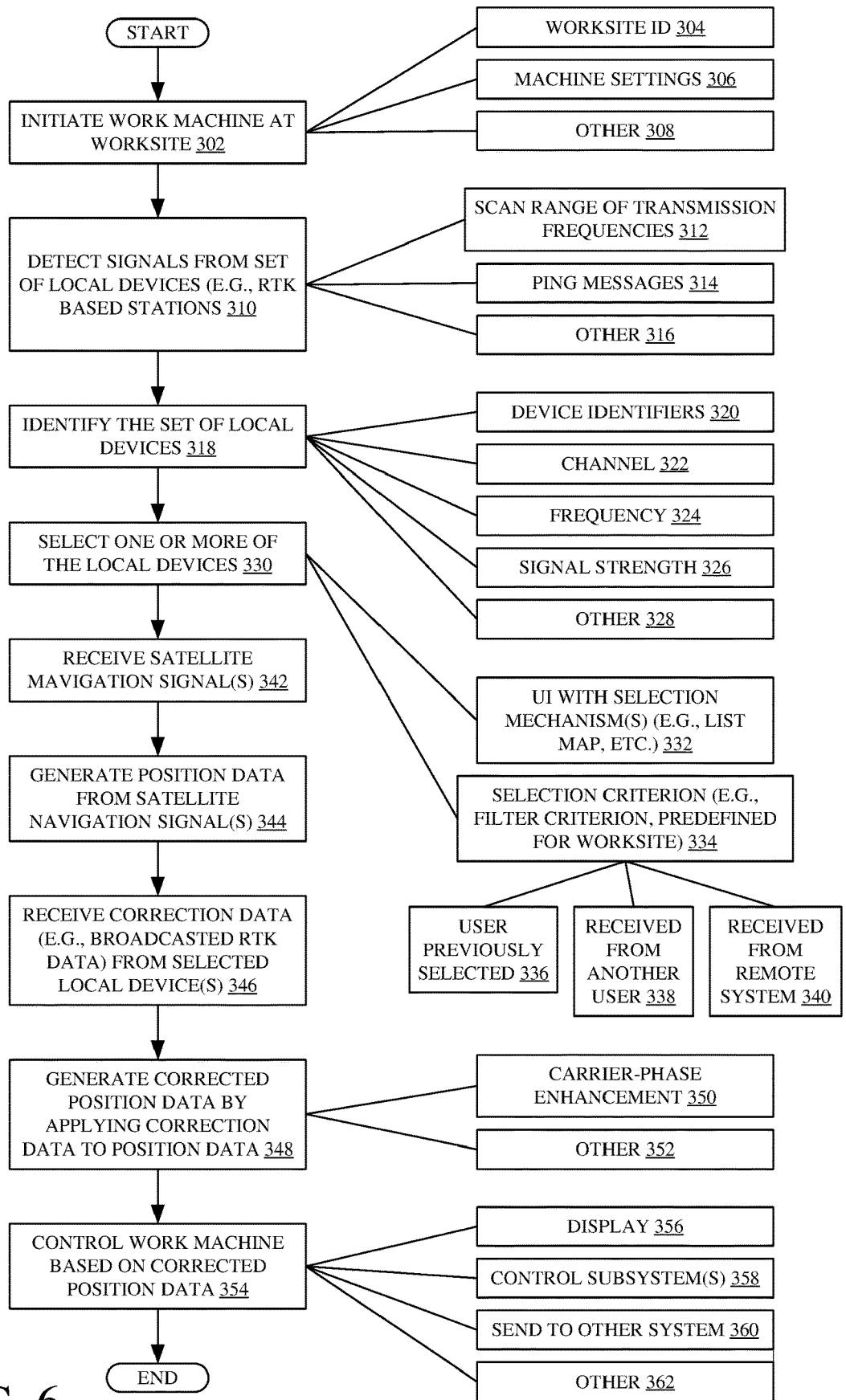
FIG. 6 is a flow diagram illustrating one example of a method performed by a computing system for a work machine at a worksite.

FIG. 6 is a flow diagram illustrating one example of a method 300 performed by a computing system for a work machine at a worksite. For sake of illustration, but not by limitation, method 300 will be described in the context of architecture 100 shown in FIG. 1.

At block 302, the work machine is initialized at a subject worksite. For instance, this includes operator 108 starting work machine 102 at a new worksite, or a previous worksite at which work machine 102 has performed work operations. Block 302 can include obtaining a worksite identifier that uniquely identifies the worksite. This is represented at block 304. Also, machine settings for work machine 102 can be obtained and set for the work machine operation. Of course, the work machine can be initiated in other ways as well. This is represented by block 308.

At block 310, system 170 is operated to detect signals from the set of local devices 120. In one example, this includes frequency scanning logic 171 scanning a range of transmission frequencies. This is represented by block 312. Alternatively, or in addition, ping messages are detected by logic 172. This is represented by block 314. Of course, the signals from the local devices can be detected in other ways as well. This is represented by block 316.

At block 318, the set of local devices is identified based on the detected signals at block 310. Identification of the local devices can include identifying device identifiers, that uniquely identify the local devices from which the signals are detected. This is represented by block 320. Alternatively, or in addition, channel information (block 322), frequency information (block 324), and/or signal strength (block 326) can be identified for each local device in the set of local devices 120. Of course, the local devices can be identified in other ways as well, and other information associated with those devices can be identified. This is indicated by block 328.

At block 330, one or more of the local devices are selected. This can be done in any of a number of ways. In one example, a user interface is rendered to operator 108 with display elements that identify the set of local devices and include selection user input mechanisms that are actuatable to select the one or more local devices from which correction data is to be received and used to correct the position data. This is represented by block 332. Alternatively, or in addition, a selection criterion can be used to select the one or more local devices. This is represented by block 334. Selection criteria can include filter criterion that are used to filter the display of the local devices and/or automatically select one or more of the local devices. Examples of filter criterion include, but are not limited to, signal strength of each local device in the set of local devices, channel settings, frequency settings, etc. A filter criterion can also include manufacturer and/or model information for the local device.

Also, the selection criterion can be predefined. For instance, the selection criterion can be based on local devices that the operator 108 has previously selected at that worksite. This is represented by block 336. In another example, the selection criterion can be based on an identification of devices that is received from another user, such as remote user 122 (block 338) or otherwise from remote system 114 (block 340). For example, a fleet manager can push selection criteria to a number of work machines in a fleet to perform work operations at a given worksite.

Figure 7:
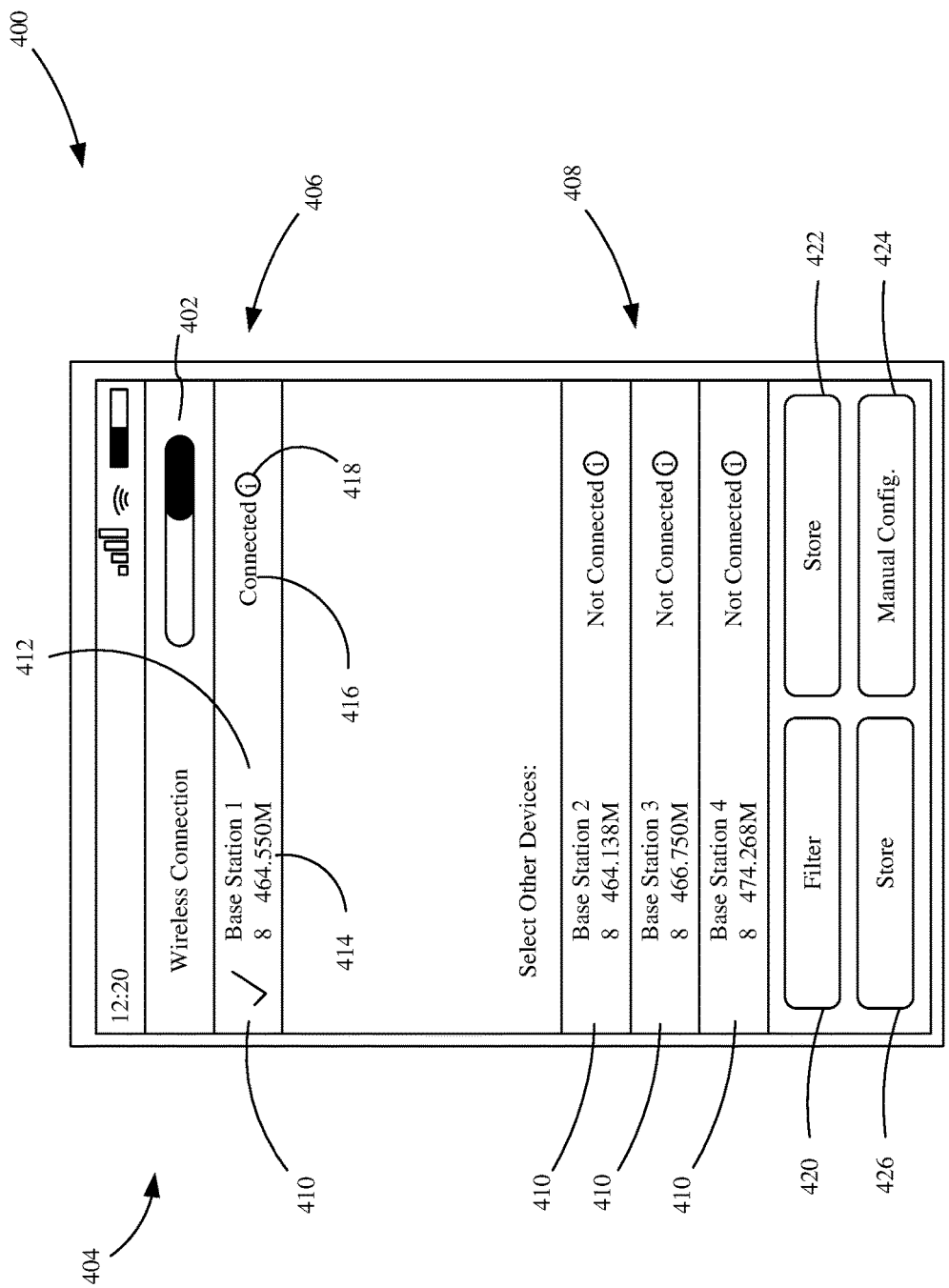
FIG. 7 illustrates an example user interface display.

FIG. 7 illustrates one example of a user interface display 400 that can be displayed at block 330 in method 300, for user selection of the one or more local devices. User interface display 400 includes a user input mechanism 402 for selectively activating the wireless connection of wireless communication logic 118, so system 170 performs frequency scanning to identify available devices 120 that are currently transmitting signals (e.g., ping messages). User interface display 400 includes a display pane 404 that lists the set of local devices 120 in a first portion 406 that includes the devices 120 that have been selected by the user, and are therefore connected to work machine 102, as well as a display portion 408 displaying other available devices 120 that have not yet been selected and/or are not connected to work machine 102. In the illustrated example, each display element 410 represents a different one of the local devices 120 and includes a first display portion 412 that identifies the local devices 120 (such as a unique user-defined name), a second portion 414 that displays the channel and frequency information for the corresponding local device 120, and a third portion 416 that indicates whether the corresponding local device 120 is connected to work machine 102. Each display element 410 can also include a user interface control 418 that is actuatable to display additional information for the corresponding local device, such as that illustrated above with respect to FIGS. 4 and 5.

User interface display 400 includes a filter user input mechanism 420 that is actuatable to filter the list of devices based on a filter criterion, a store user input mechanism that is actuatable to store the selected local device(s) 120 in association with the current worksite. In one example, this is stored as worksite/device mappings 131 in data store 130. An example of worksite/device mappings is illustrated in further detail below with respect to FIG. 9.

User interface display 400 also includes a manual configuration user input mechanism 424 that is actuatable to allow the user to manually input device information to identify and connect to a local device 120. Examples of manual configuration are discussed above. User input mechanism 426 is actuatable to accept the device selections and close display 400.

Figure 8:
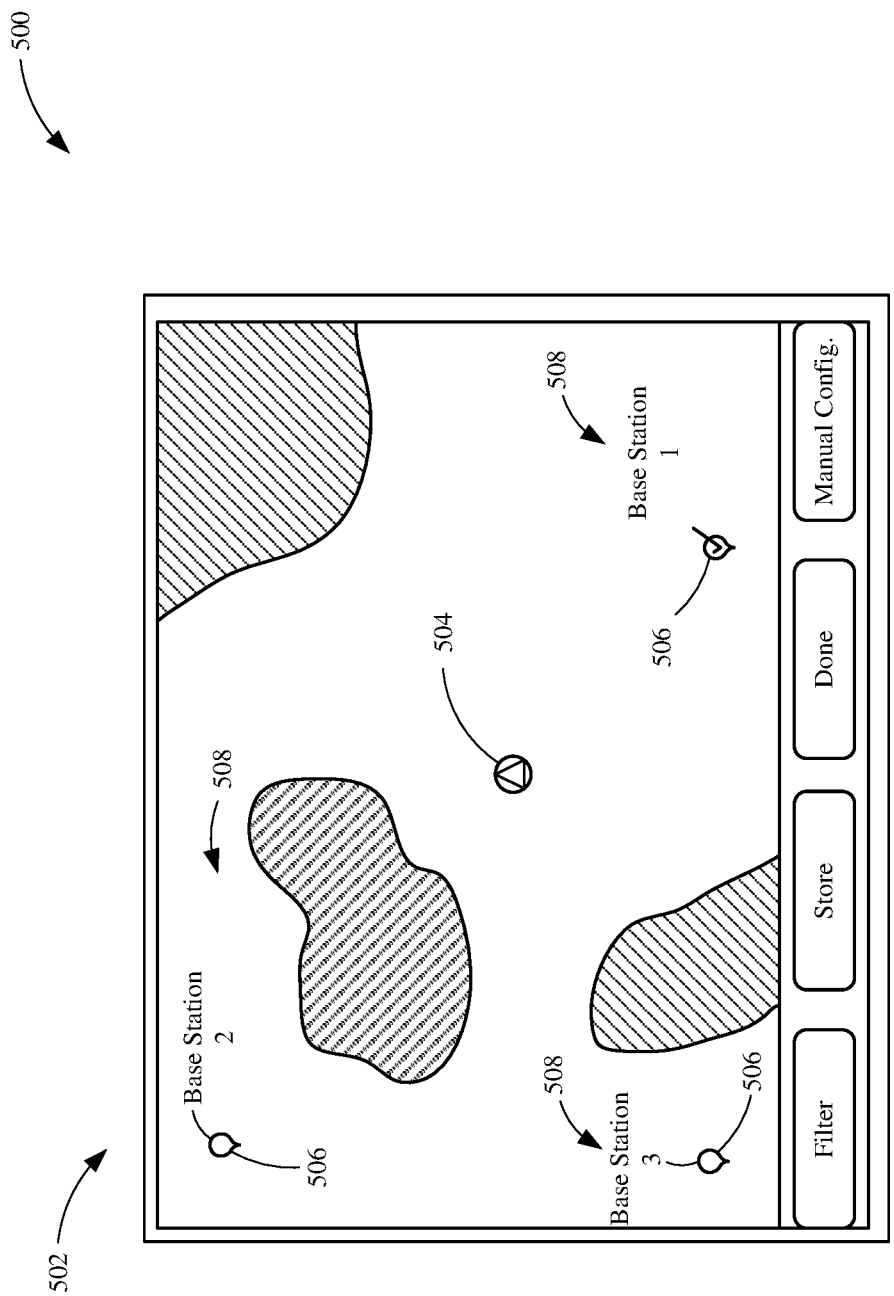
FIG. 8 illustrates an example user interface display.

FIG. 8 illustrates another example of a user interface display 500 in which identified local devices are displayed on a map display 502. In one example, map display 502 includes display elements superimposed on a satellite image of the worksite. The display elements include a work machine display element 504 that indicates a position of work machine 102. A set of device display elements 506 indicate the location of the identified local devices on the map, relative to the work machine. Each display element 506 can include a label portion 508 that includes information identifying the corresponding local device. The user selects one or more of the local devices by actuating corresponding user input mechanisms associated with display elements 506 and/or label portion 508.

Figure 9:
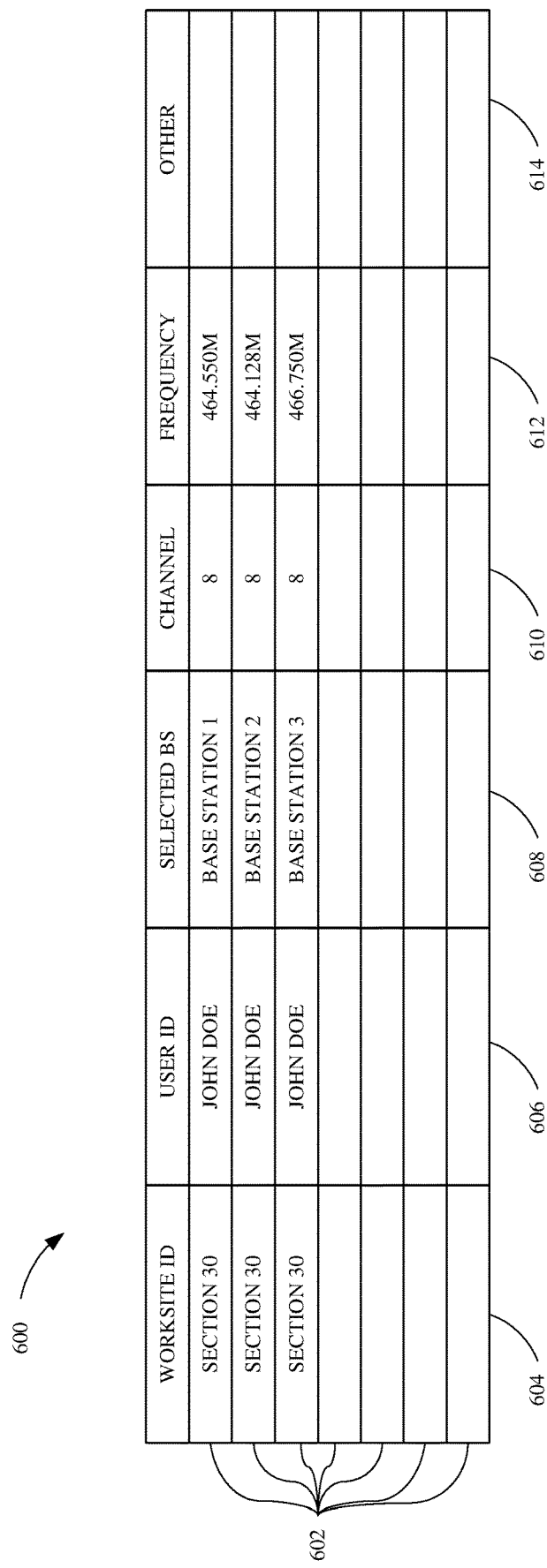
FIG. 9 illustrates an example worksite/device mapping.

FIG. 9 illustrates one example of worksite/device mappings 131, which are stored as data records in data store 130. As shown in FIG. 9, a set of data records are stored in a mapping table 600, having a set of entries 602 each representing one of the mappings 131. Each entry 602 includes a plurality of fields 604, 606, 608, 610, 612, and 614. Worksite ID field 604 includes a worksite ID that identifies the worksite, user ID field 606 stores a user ID that identifies the user that created the mapping, and base station ID field 608 identifies the selected base station (or other local device) that was selected by the user at the worksite. The entries can also include a channel field 610 that identifies a communication channel of the corresponding local device and a frequency field 612 that identifies the frequency of the local device. This, of course, is for sake of example only.

Referring again to FIG. 6, at block 342 satellite navigation signal(s) are received from the set of satellite transmitters 142. Based on these satellite navigation signals, at block 344, position data is generated by position date generation logic 164. The position data illustratively indicates a geographic position or work machine 102, with relatively low precision (or at least lower than the corrected position data).

At block 346, correction data is received from the selected local devices, that were selected at block 330. In one example, this includes receiving RTK data that is broadcasted by each selected local device.

At block 348, corrected position data is generated by applying correction data to the position data generated at block 344. In one example, this comprises performing carrier-phase enhancement, which is described above. Of course, the corrected position data can be generated in other ways as well. This is represented by block 352. At block 354, the work machine is controlled based on the corrected position data. This can be done in any of a number of ways. In one example, control system 104 controls display generator logic 128 to display an indication of the geographic position of work machine 102, based on the corrected position data. This is represented by block 356. Alternatively, or in addition, one or more controllable subsystems 106 are controlled by control system 104 based on the corrected position data. This is represented by block 358. Also, the corrected position data can be sent to another system, such as remote system 114. This is represented by block 360. Of course, the work machine can be controlled in other ways as well. This is represented by block 362.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
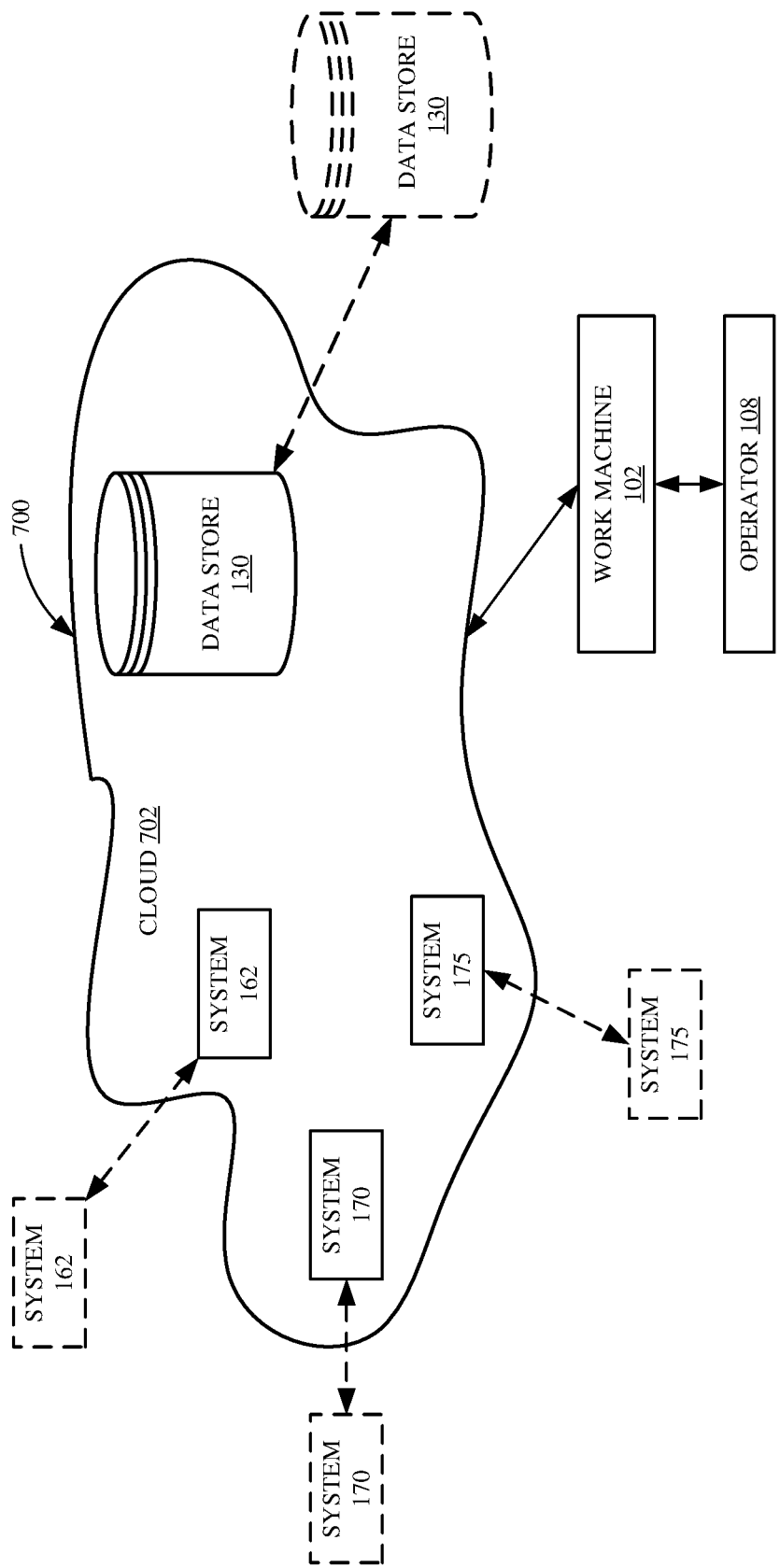
FIG. 10 is a block diagram showing one example of the architecture illustrated in FIG. 1, deployed in a remote server architecture.

FIG. 10 is a block diagram of one example of work machine architecture 100, shown in FIG. 1, where work machine 102 communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in FIG. 1 and they are similarly numbered. FIG. 10 specifically shows that system 162, system 170, system 175, and data store 130 can be located at a remote server location 702. Therefore, work machine 102 accesses those systems through remote server location 702.

FIG. 10 also depicts another example of a remote server architecture. FIG. 10 shows that it is also contemplated that some elements of FIG. 1 are disposed at remote server location 702 while others are not. By way of example, data store 130 can be disposed at a location separate from location 702, and accessed through the remote server at location 702. Alternatively, or in addition, systems 162, 170, and/or 175 can be disposed at location(s) separate from location 702, and accessed through the remote server at location 702.

Regardless of where they are located, they can be accessed directly by work machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the work machine comes close to the fuel truck for fueling, the system automatically collects the information from the work machine or transfers information to the work machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the work machine until the work machine enters a covered location. The work machine, itself, can then send and receive the information to/from the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
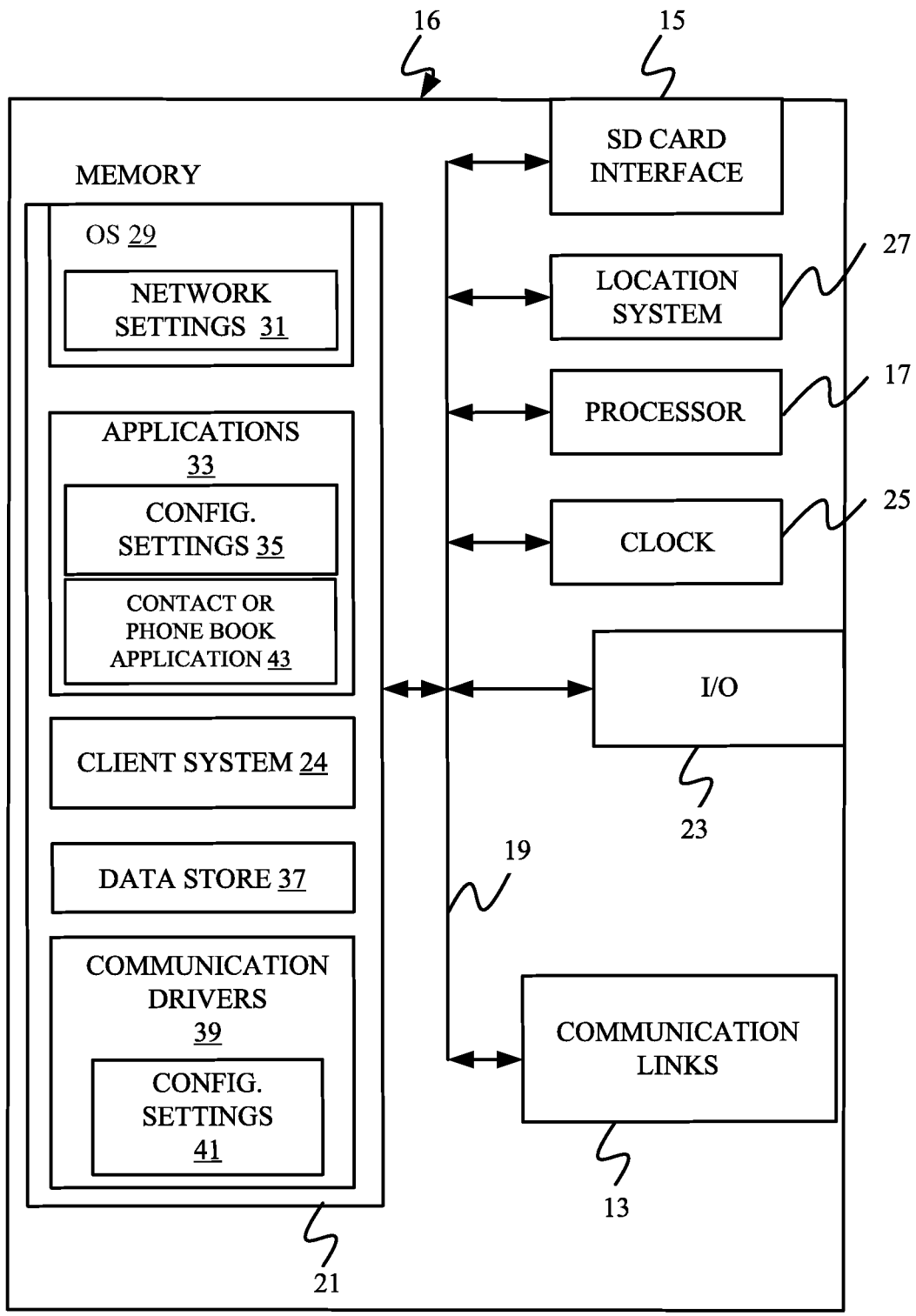
FIG. 11 is a block diagram of a mobile device.
Figure 12:
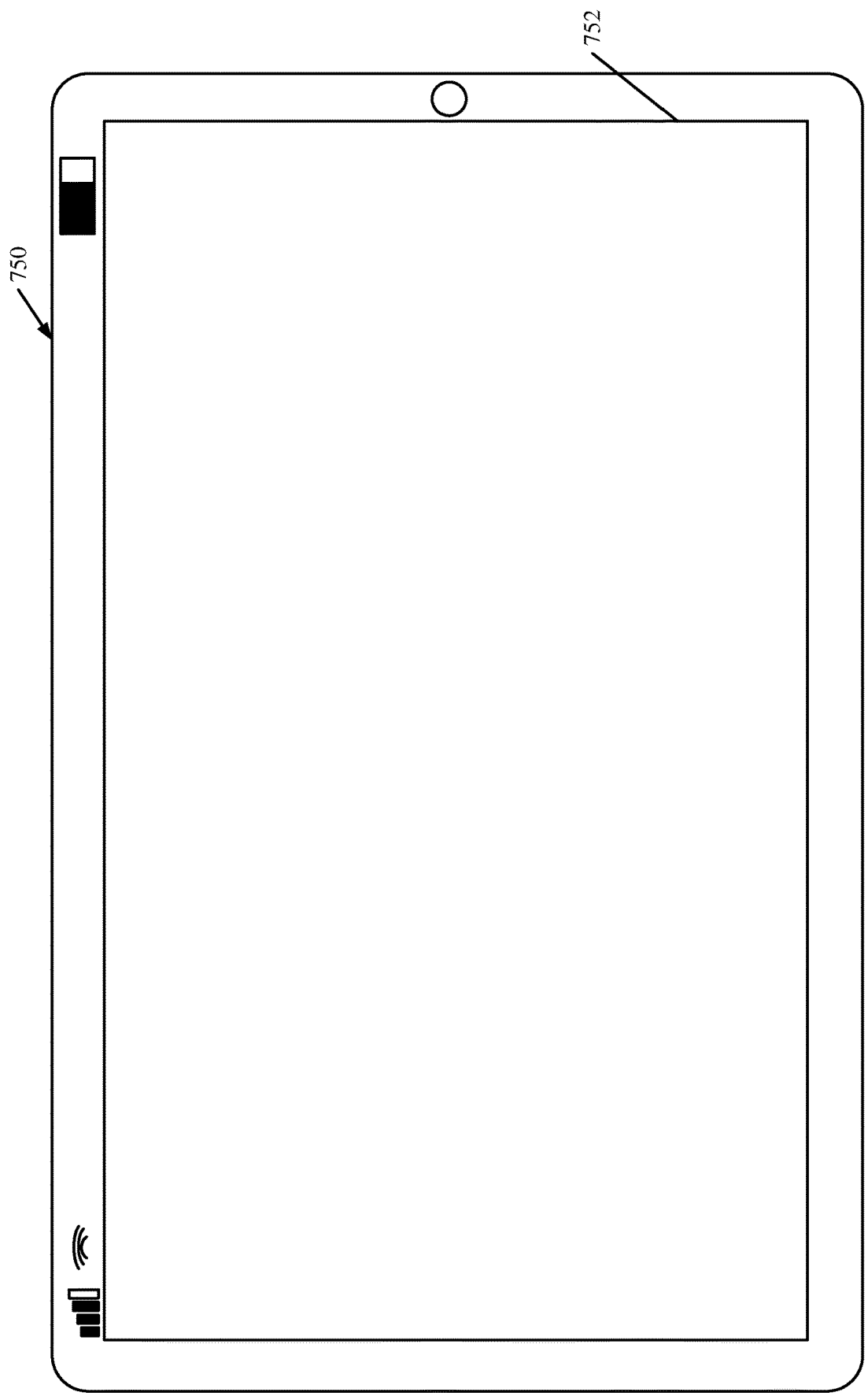
FIGS. 12-13 show examples of mobile devices that can be used in the architectures shown in the previous figures.
Figure 13:
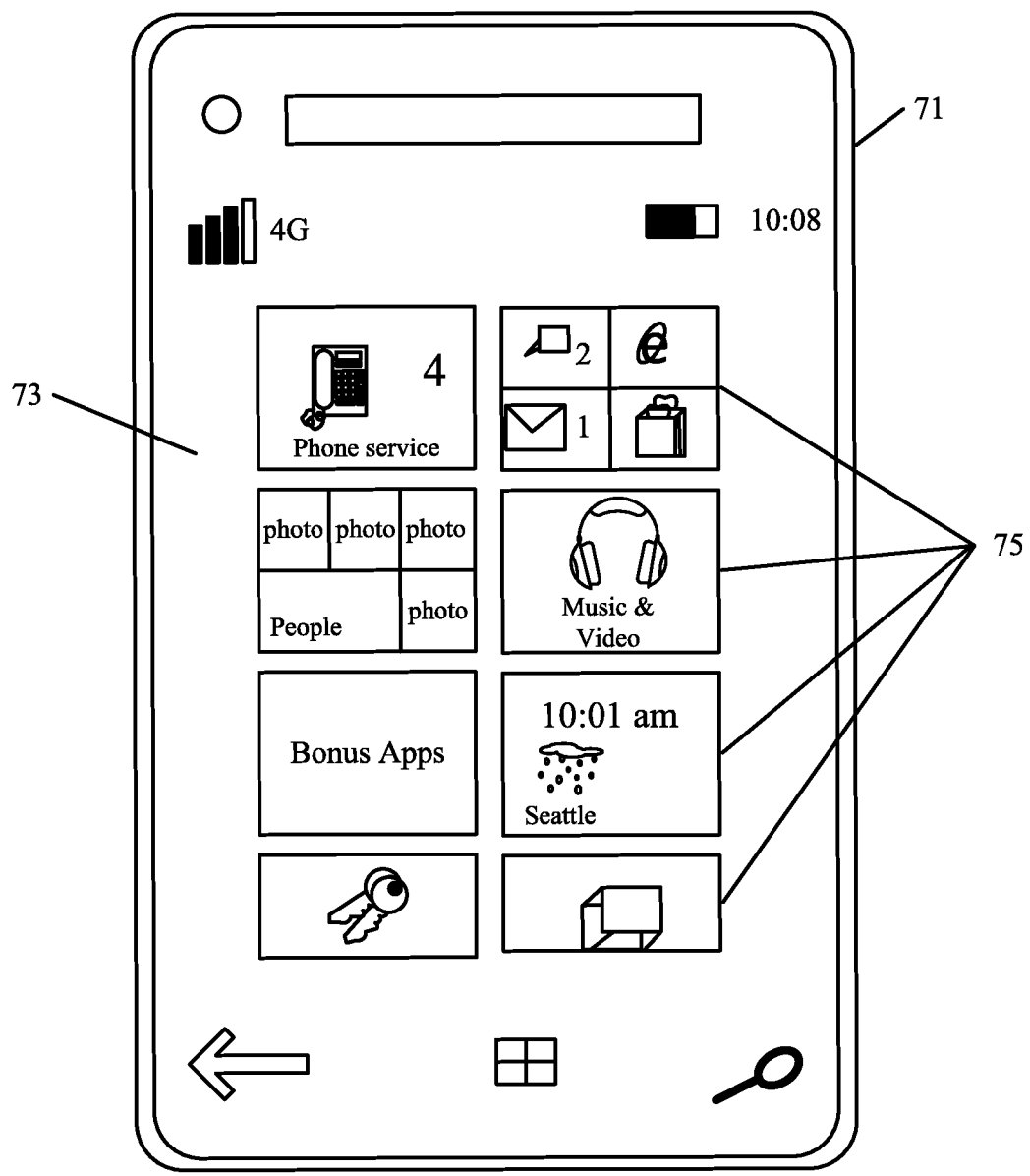

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of work machine 102 or as remote system 114. FIGS. 12-13 are examples of handheld or mobile devices.

FIG. 11 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 is a tablet computer 750. In FIG. 12, computer 750 is shown with user interface display screen 752. Screen 752 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 750 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
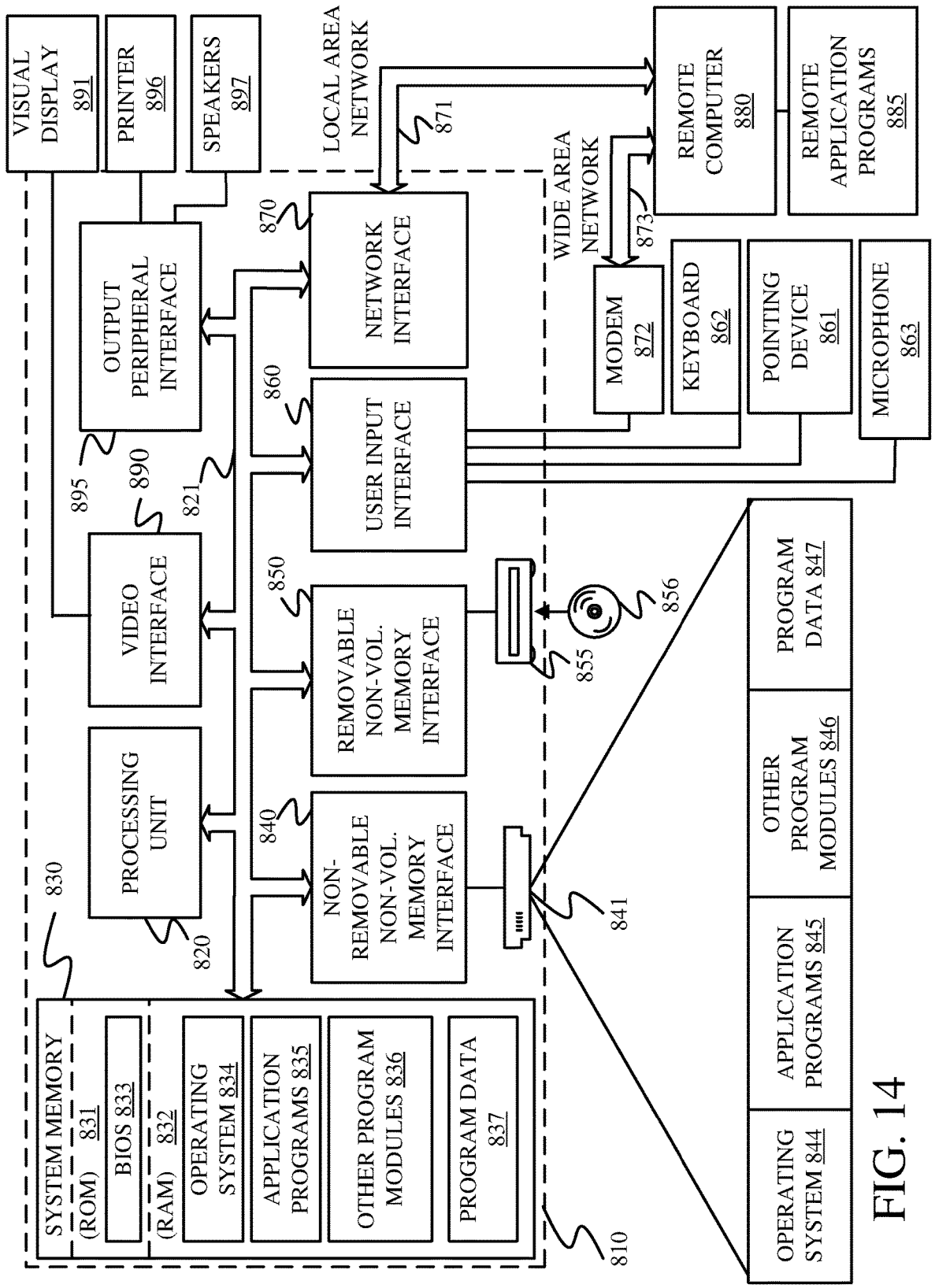
FIG. 14 is a block diagram showing one example of a computing environment that can be used in the architectures shown in the previous figures.

FIG. 14 is one example of a computing environment in which elements of FIG. 1, or parts of it, (for example) can be deployed. With reference to FIG. 14, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network-LAN, or wide area network-WAN or a controller area network-CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a method performed by a computing system for a work machine at a worksite, the method comprising:
  automatically identifying a set of local devices corresponding to the worksite based on signals detected from the set of local devices, wherein each of the local devices is configured to transmit correction data for correcting position data derived from a satellite navigation signal;
  selecting one or more local devices from the set of local devices;
  receiving the satellite navigation signal;
  generating, from the received satellite navigation signal, the position data indicative of a geographic position of the work machine at the worksite;
  receiving the correction data from the one or more local devices;
  generating corrected position data by applying the correction data to the position data; and
  controlling the work machine based on the corrected position data.

Example 2 is the method of any or all previous examples, wherein selecting comprises:
  displaying a user interface display including display elements that represents the set of local devices and includes a user input mechanism; and
  selecting the one or more local devices based on user input received through the user input mechanisms.

Example 3 is the method of any or all previous examples, wherein automatically identifying comprises:
  detecting the signals from the set of local devices by scanning a range of transmission frequencies.

Example 4 is the method of any or all previous examples, wherein detecting the signals comprises detecting ping messages from the set of local devices.

Example 5 is the method of any or all previous examples, wherein the one or more satellite navigations signals are received from a plurality of satellites associated with a global navigation satellite system (GNSS).

Example 6 is the method of any or all previous examples, wherein generating corrected position data comprises performing carrier-phase enhancement on the position data.

Example 7 is the method of any or all previous examples, wherein the correction data comprises real-time kinematic (RTK) data encoded in one or more RTK signals received from the one or more local devices.

Example 8 is the method of any or all previous examples, wherein selecting comprises identifying a selection criterion and selecting the one or more local devices based on the selection criterion.

Example 9 is the method of any or all previous examples, wherein the selection criterion is based on prior selection data associated with the worksite.

Example 10 is the method of any or all previous examples, wherein the selection criterion comprises a filter criterion.

Example 11 is the method of any or all previous examples, and further comprising storing a data record that associates the selected one or more local devices with a worksite identifier that identifies the worksite.

Example 12 is a computing system for a work machine, the computing system comprising:
  a local device identification system configured to automatically identify a set of local devices corresponding to the worksite based on signals detected from the set of local devices, wherein each of the local devices is configured to transmit correction data for correcting position data derived from a satellite navigation signal;
  a local device selection system configured to select one or more local devices from the set of local devices;
  a position data generation system configured to:
    receive the satellite navigation signal;
    generate, from the received satellite navigation signal, the position data indicative of a geographic position of the work machine at the worksite; and
    generate corrected position data by applying the correction data to the position data; and
  a control system configured to control the work machine based on the corrected position data.

Example 13 is the computing system of any or all previous examples, wherein the local device selection system is configured to:
  display a user interface display including display elements that represents the set of local devices and includes a user input mechanism; and
  select the one or more local devices based on user input received through the user input mechanisms.

Example 14 is the computing system of any or all previous examples, wherein the local device identification system is configured to:
  detect the signals from the set of local devices by scanning a range of transmission frequencies.

Example 15 is the computing system of any or all previous examples, wherein the one or more satellite navigations signals are received from a plurality of satellites associated with a global navigation satellite system (GNSS).

Example 16 is the computing system of any or all previous examples, wherein the position data generation system is configured to perform carrier-phase enhancement on the position data using kinematic (RTK) data encoded in one or more RTK signals received from the one or more local devices.

Example 17 is the computing system of any or all previous examples, wherein the local device selection system is configured to:
  identify a selection criterion; and
  select the one or more local devices based on the selection criterion.

Example 18 is the computing system of any or all previous examples, wherein the local device selection system is configured to store a data record that associates the selected one or more local devices with a worksite identifier that identifies the worksite.

Example 19 is a work machine system comprising:
  one or more controllable subsystems;
  a local device identification system configured to automatically identify a set of local devices corresponding to the worksite based on signals detected from the set of local devices, wherein each of the local devices is configured to transmit real-time kinematic (RTK) correction data for correcting position data derived from a satellite navigation signal;
  a local device selection system configured to:
    display a user interface display including display elements that represents the set of local devices and includes a user input mechanism; and
    select one or more local devices based on user input received through the user input mechanisms;
  a position data generation system configured to:
    receive the satellite navigation signal;
    generate, from the received satellite navigation signal, the position data indicative of a geographic position of the work machine at the worksite; and
    generate corrected position data by applying the RTK correction data to the position data; and
  a control system configured to control the one or more controllable subsystems based on the corrected position data.

Example 20 is the work machine system of any or all previous examples, wherein the local device identification system is configured to:
  detect the signals from the set of local devices by scanning a range of transmission frequencies.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system for a work m machine at a worksite, the method comprising:
  automatically identifying a set of local devices corresponding to the work site based on signals detected from the set of local devices, wherein automatically identifying comprises detecting the signals from the set of local devices by scanning a range of transmission frequencies and wherein each of the local devices is configured to transmit correction data for correcting position data derived from a satellite navigation signal;
  selecting one or more local devices from the set of local devices;
  receiving the satellite navigation signal;
  generating, from the received satellite navigation signal, the position data indicative of a geographic position of the work machine at the worksite;
  receiving the correction data from the one or more local devices;
  generating corrected position data by applying the correction data to the position data; and
  controlling the work machine based on the corrected position data.

2. The method of claim 1, wherein selecting comprises:
  displaying a user interface display including display elements that represents the set of local devices and includes a user input mechanism; and
  selecting the one or more local devices based on user input received through the user input mechanisms.

3. The method of claim 1, wherein detecting the signals comprises detecting ping messages from the set of local devices.

4. The method of claim 1, wherein receiving the satellite navigation signal comprises receiving a plurality of satellite navigation signals from a plurality of satellites associated with a global navigation satellite system (GNSS).

5. The method of claim 1, wherein corrected position data comprises performing carrier-phase enhancement on the position data.

6. The method of claim 5, wherein the correction data comprises real-time kinematic (RTK) data encoded in one or more RTK signals received from the one or more local devices.

7. The method of claim 1, wherein selecting comprises identifying a selection criterion and selecting the one or more local devices based on the selection criterion.

8. The method of claim 1, wherein the selection criterion is based on prior selection data associated with the worksite.

9. The method of claim 1, wherein the selection criterion comprises a filter criterion.

10. The method of claim 1, and further comprising storing a data record that associates the selected one or more local devices with a worksite identifier that identifies the worksite.

11. A computing system far a work machine, the computing system comprising:
  a local device identification system configured to automatically identify a set of local devices corresponding to the worksite based on signals detected from the set of local devices, wherein the local device identification system is configured to detect the signals from the set of local devices by scanning a range of transmission frequencies and wherein each of the local devices is configured to transmit correction data for correcting position data derived from a satellite navigation signal;
  a local device selection system configured to select one or more local devices from the set of local devices;
  a position data generation system configured to:
    receive the satellite navigation signal;
    generate, from the received satellite navigation signal, the position data indicative of a geographic position of the work machine at the worksite; and
    generate corrected position data by applying the correction data to the position data; and
  controlling the work machine based on the corrected position data.

12. The computing system of claim 11, wherein the local device selection system is configured to:
  display a user interface display including display elements that represent the set of local devices and includes a user input mechanism; and
  select the one or more local devices based on user input received through the user input mechanism.

13. The computing system of claim 11, wherein the satellite navigation signal comprises a plurality of satellite navigation signals and are received from a plurality of satellites associated with a global navigation satellite system (GNSS).

14. The computing system of claim 11, wherein the position data generation system is configured to perform carrier-phase enhancement on the position data using kinematic (RTK) data encoded in one or more RTK signals received from the one or more local devices.

15. The computing system of claim 11, wherein the local device selection system is configured to:
  identify a selection criterion; and
  select the one or more local devices based on the selection criterion.

16. The computing system of claim 11, wherein the local device selection system is configured to store a data record that associates the selected one or more local devices with a worksite identifier that identities the worksite.

17. A work machine system comprising:
one or more controllable subsystems;
a local device identification system configured to automatically identify a set of local devices corresponding to the worksite based on signals detected from the set of local devices, wherein the local device identification system is configured to detect the signals from the set of local devices by scanning a range of transmission frequencies and wherein each of the local devices is configured to transmit real-time kinematic (RTK) correction data for correcting position data derived from a satellite navigation signal;
a local device selection system configured to:
  display a user interface display including display elements that represents the set of local devices and includes a user input mechanism; and
  Select one or more local devices based on user input received through the user input mechanisms;
a position data generation system configured to:
  receive the satellite navigation signal;
  generate, from the received satellite navigation signal, the position data indicative of a geographic position of the work machine at the worksite; and
  generate corrected position data by applying the RTK correction data to the position data; and
a control system configured to control the one or more controllable subsystems based on the corrected position data.

18. The computing system of claim 3, wherein each signal of the signals from the set of local devices include device information corresponding to the device from which each signal is transmitted.

19. The computing system of claim 11, wherein the signals comprise ping messages from the set of local devices.

20. The work machine system of claim 17, wherein the signals comprise ping messages from the set of local devices.

* * * * *